(12) United States Patent
Jaskiewicz et al.

(10) Patent No.: US 10,145,126 B2
(45) Date of Patent: Dec. 4, 2018

(54) INSTALLATION TOOLS AND PRE-HUNG DOOR WITH THE SAME

(71) Applicant: Endura Products, Inc., Colfax, NC (US)

(72) Inventors: Tomasz Jaskiewicz, Oak Ridge, NC (US); Michael K. Mitchell, Winston-Salem, NC (US)

(73) Assignee: Endura Products, Inc., Colfax, NC (US)

( * ) Notice: Subject to any disclaimer, the term of this patent is extended or adjusted under 35 U.S.C. 154(b) by 162 days.

(21) Appl. No.: 15/392,607

(22) Filed: Dec. 28, 2016

(65) Prior Publication Data

US 2017/0204622 A1    Jul. 20, 2017

Related U.S. Application Data

(60) Provisional application No. 62/279,028, filed on Jan. 15, 2016.

(51) Int. Cl.
*E06B 3/00* (2006.01)
*E04F 21/00* (2006.01)
*E06B 7/28* (2006.01)
*G01C 9/34* (2006.01)

(52) U.S. Cl.
CPC ............ *E04F 21/0023* (2013.01); *E06B 7/28* (2013.01); *G01C 9/34* (2013.01)

(58) Field of Classification Search
CPC .............. E04F 21/0023; E04F 21/0007; E04F 21/0015; E06B 7/28; G01C 9/34; G01C 9/28; G01C 9/30; G01C 9/32; G01C 9/36; B65D 81/055; E05F 3/227; E05Y 2600/56; E05Y 2900/132; Y10T 290/4978
USPC .... 49/501, 380, 339, 346, 324; 33/379, 389; 248/542, 544, 904, 205.1
See application file for complete search history.

(56) References Cited

U.S. PATENT DOCUMENTS

| 4,733,475 A * | 3/1988 | Youmans ................. G01C 9/28 33/194 |
| 4,739,561 A | 4/1988 | Mills |
| D319,007 S | 8/1991 | Rogers et al. |
| 5,159,782 A | 11/1992 | Sales |
| 5,222,303 A * | 6/1993 | Jardine .................... G01B 3/02 33/528 |
| 5,365,697 A | 11/1994 | Vanderpan |
| 5,562,315 A | 10/1996 | Sales |
| 5,581,900 A | 12/1996 | Payne |
| 5,655,332 A | 8/1997 | Papadopoulos |
| 5,655,343 A | 8/1997 | Seals |

(Continued)

*Primary Examiner* — Chi Q Nguyen
(74) *Attorney, Agent, or Firm* — Womble Bond Dickinson (US) LLP (57) ABSTRACT

A tool for use during installation of a pre-hung door. The tool includes a base and at least one orientation indicator, such as a bubble level, mounted to the base. The tool also includes at least one spacer extending from the base. The at least one spacer may be positioned between an edge of a door panel and a respective adjacent portion of a door frame. The tool may also include at least one tongue extending from the base in a direction opposite the at least one spacer. The at least one tongue may be positioned between a weather strip and a face of the door frame so that the tool can remain in place when the door panel is open relative to the door frame.

10 Claims, 8 Drawing Sheets

(56) References Cited

U.S. PATENT DOCUMENTS

| | | | |
|---|---|---|---|
| 6,286,802 B1 * | 9/2001 | Munson | A47G 1/1606 248/475.1 |
| 6,357,200 B1 | 3/2002 | Vanderpan | |
| 6,442,853 B1 * | 9/2002 | Hale | G01C 9/28 33/194 |
| 6,615,500 B2 | 9/2003 | Hale et al. | |
| 6,725,604 B1 | 4/2004 | Vanderpan | |
| 6,966,119 B1 | 11/2005 | Dlugoleski | |
| 7,118,143 B2 | 10/2006 | L'Heureux | |
| 7,213,371 B1 | 5/2007 | Vanderpan | |
| 7,281,338 B2 * | 10/2007 | Ziegmann | A47B 88/423 33/474 |
| 7,331,146 B1 | 2/2008 | Beutler et al. | |
| 7,591,073 B1 | 9/2009 | Eckles et al. | |
| 7,987,637 B2 | 8/2011 | Smith | |
| 8,418,375 B2 | 4/2013 | Zadnik | |
| 8,677,636 B2 | 3/2014 | Kelley | |
| 8,732,972 B2 | 5/2014 | Jordan | |
| 9,010,704 B2 | 4/2015 | Sirek et al. | |
| 9,115,526 B2 * | 8/2015 | Houser | E05F 3/227 |
| 9,194,170 B2 | 11/2015 | Eis et al. | |
| 2003/0005589 A1 | 1/2003 | Hale et al. | |
| 2004/0060241 A1 * | 4/2004 | Staples | E06B 7/28 49/380 |
| 2005/0086879 A1 | 4/2005 | Sales | |
| 2005/0284091 A1 | 12/2005 | Sales | |
| 2006/0236611 A1 | 10/2006 | Klingbyle | |
| 2008/0276421 A1 | 11/2008 | Vanderpan | |
| 2010/0115781 A1 * | 5/2010 | Norelli | G01C 9/28 33/371 |
| 2011/0138642 A1 * | 6/2011 | Norelli | G01C 9/28 33/371 |
| 2012/0204434 A1 | 8/2012 | Kelley | |
| 2013/0075558 A1 | 3/2013 | Houser et al. | |
| 2013/0167387 A1 * | 7/2013 | Lueck | G01C 9/28 33/374 |
| 2013/0219732 A1 | 8/2013 | Jordan | |
| 2016/0145028 A1 * | 5/2016 | Kelley | E04F 21/0007 49/380 |
| 2017/0268240 A1 | 9/2017 | Ege et al. | |
| 2017/0328128 A1 * | 11/2017 | Odish | E06B 9/266 |

\* cited by examiner

INSTALLATION TOOLS AND PRE-HUNG DOOR WITH THE SAME

TECHNICAL FIELD

The present disclosure relates to building products and tools for simplifying installation of building products. More particularly, the present disclosure relates to tools for assisting with the installation of pre-hung doors.

BACKGROUND

Figure 1:
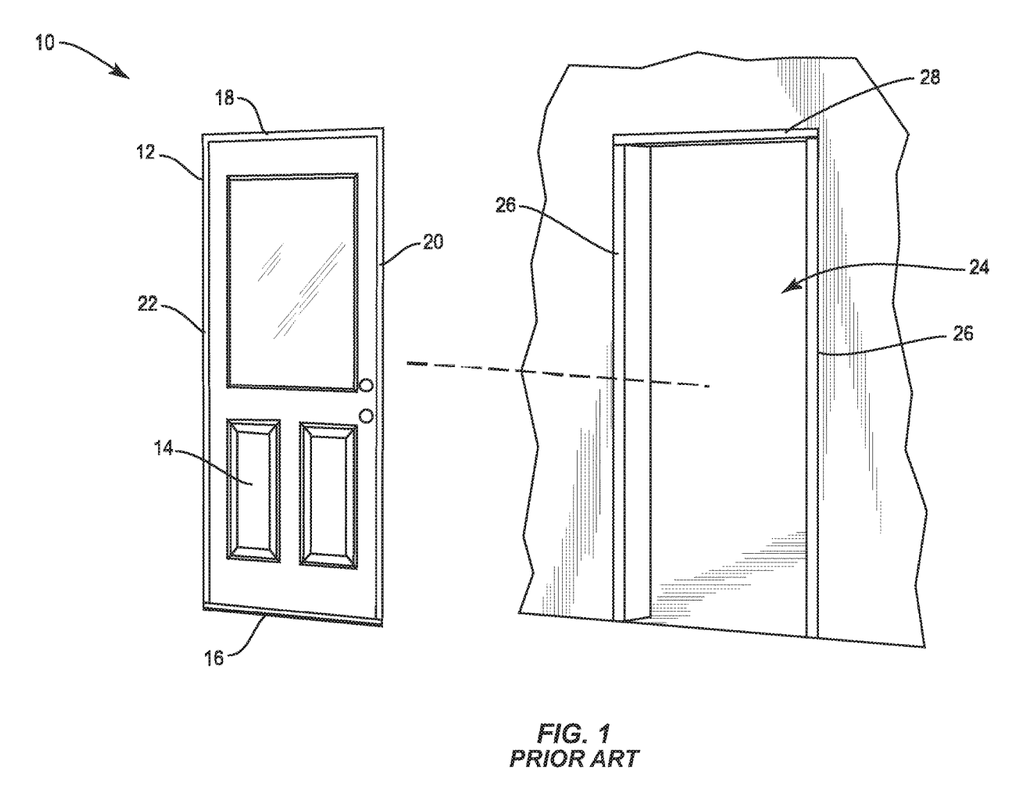
FIG. 1 is an exploded perspective view of a typical pre-hung door for installation into an exterior rough opening of a building.

A common technique for the installation of an exterior door includes the use of a pre-hung door. A typical pre-hung door 10, as shown in FIG. 1, includes a frame 12 and a door panel 14. The frame 12 typically includes a threshold 16, a header 18, a latch-side jamb 20 and a hinge-side jamb 22. A plurality of hinges mount the door panel 14 to the hinge-side jamb 22. The pre-hung door 10 may then be installed within a rough opening 24 of a building defined by at least a pair of studs 26 and a cross beam 28.

Pre-hung doors 10 (also referred to as door units) are often preferred to separately hanging slab doors, especially for exterior entryways. This is because pre-hung doors 10 are pre-assembled to provide a tight fitting, substantially water-tight seal between the frame 12 and the door panel 14. Pre-hung doors 10, however, typically require two people for proper installation. Often, one person handles the door unit and positions the door unit with a level, while the second person fastens the door unit to the rough opening. Occupying the time of two people is labor intensive and costly. Installation by one person, or faster installation by two people is preferred.

Additionally, pre-hung doors 10 can lack rigidity prior to installation. Thus, portions of pre-hung doors 10 have been found to bend, bow, twist, expand, contract or otherwise shift during shipping, handling and installation. These changes can reduce the quality of the pre-assembled seal between the frame 12 and the door panel 14. Maintaining or returning to proper alignment and spacing between the door panel 14 and surrounding frame 12 can be highly dependent upon installation practices and the skill of the installers.

The present disclosure seeks to provide an installation tool to simplify or reduce labor demands during installation of pre-hung doors 10. In some instances, the installation tools also assist with maintaining the proper alignment of the frame 12 and door panel 14 of a pre-hung door 10 during shipping, handling and installation.

SUMMARY

Embodiments of the present disclosure include a tool for use during installation of a pre-hung door. The tool includes a base and at least one orientation indicator, such as a bubble level, mounted to the base. The tool also includes at least one spacer extending from the base. The at least one spacer may be positioned between an edge of a door panel and a respective adjacent portion of a door frame. The tool may also include at least one tongue extending from the base in a direction opposite the at least one spacer. The at least one tongue may be positioned between a weather strip and a face of the door frame so that the tool can remain in place when the door panel is open relative to the door frame.

Other embodiments of the present disclosure include a pre-hung door having one or more installation tools. The pre-hung door may include a door frame, comprising: a first vertical member, a second vertical member, and a header spanning the top of the door frame from the first vertical member to the second vertical member. The pre-hung door may also include a door panel, and at least one hinge mounting the door panel to the first vertical member. The pre-hung door may then comprise a first tool having a base with at least one orientation indicator mounted to the base. The tool may also include at least one spacer extending from the base, the at least one spacer positioned between an edge of the door panel and a respective portion of the door frame adjacent thereto. The tool may also have at least one tongue extending from the base in a direction opposite the at least one spacer, the at least one tongue inserted between a weather strip and a face of the door frame such that the first tool remains in place when the door panel is open.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 2:
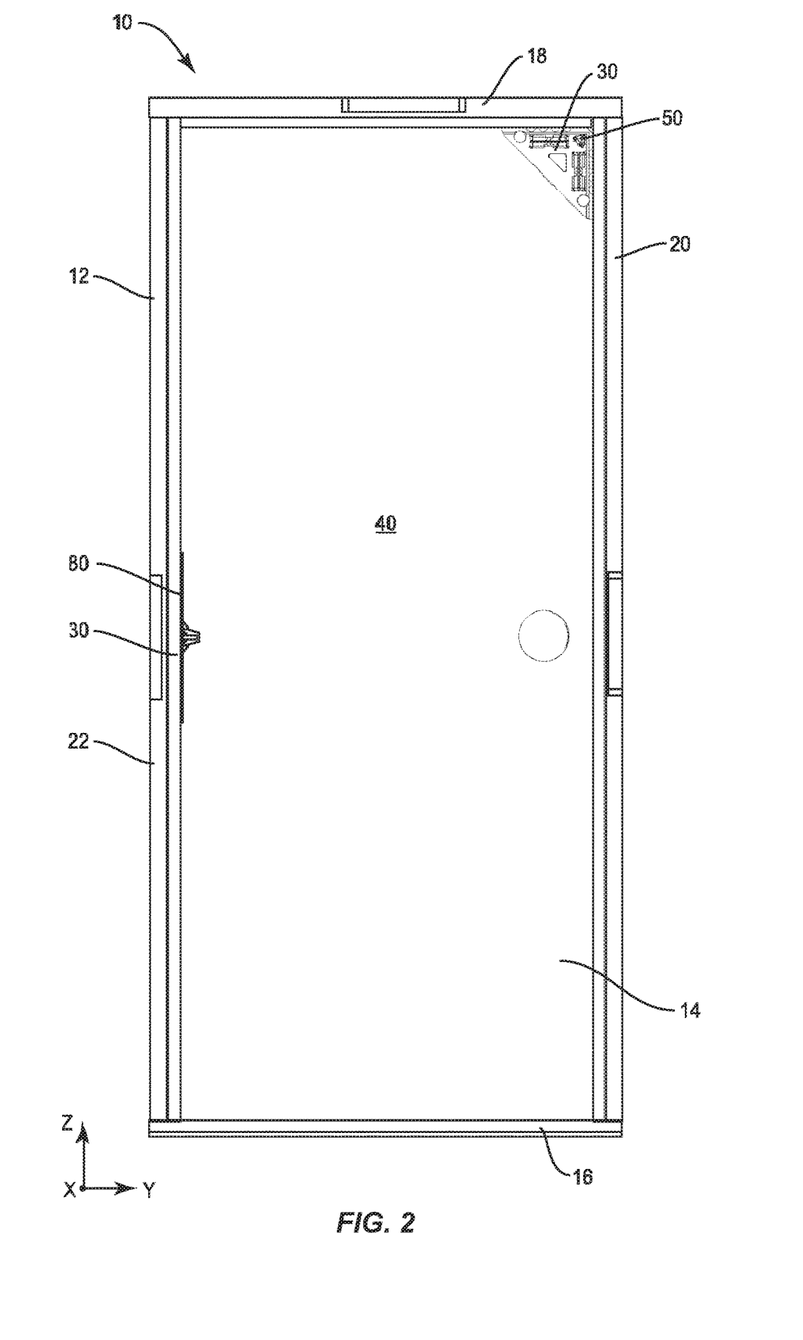
FIG. 2 is an exterior view of a pre-hung door with installation tools according to embodiments of the present disclosure.

FIG. 2 shows an exterior view of a pre-hung door 10 having a pair of installation tools 30 according to embodiments of the present disclosure. FIG. 2 represents an exterior view of an in-swing pre-hung door, but the installation tools 30 described herein would be equally applicable to out-swing doors. Also, the installation tools 30 are configured to work with both left-handed and right-handed door panels 14.

The installation tools 30 may be used individually or in combination to assist with the proper installation of the pre-hung door 10. In one embodiment, the installation tools 30 assist by providing an indication of the orientation of the pre-hung door 10 relative to gravity as the pre-hung door is installed in a rough opening 24 (FIG. 1). As used herein, the pre-hung door 10 is "level" when the pre-hung door is horizontal with respect to rotation about an axis normal to the closed pre-hung door (see the X-axis in FIG. 2). As used herein, the pre-hung door 10 is "plumb" when the pre-hung door is vertical with respect to rotation about an axis along the width of the pre-hung door (see the Y-axis in FIG. 2).

Figure 3:
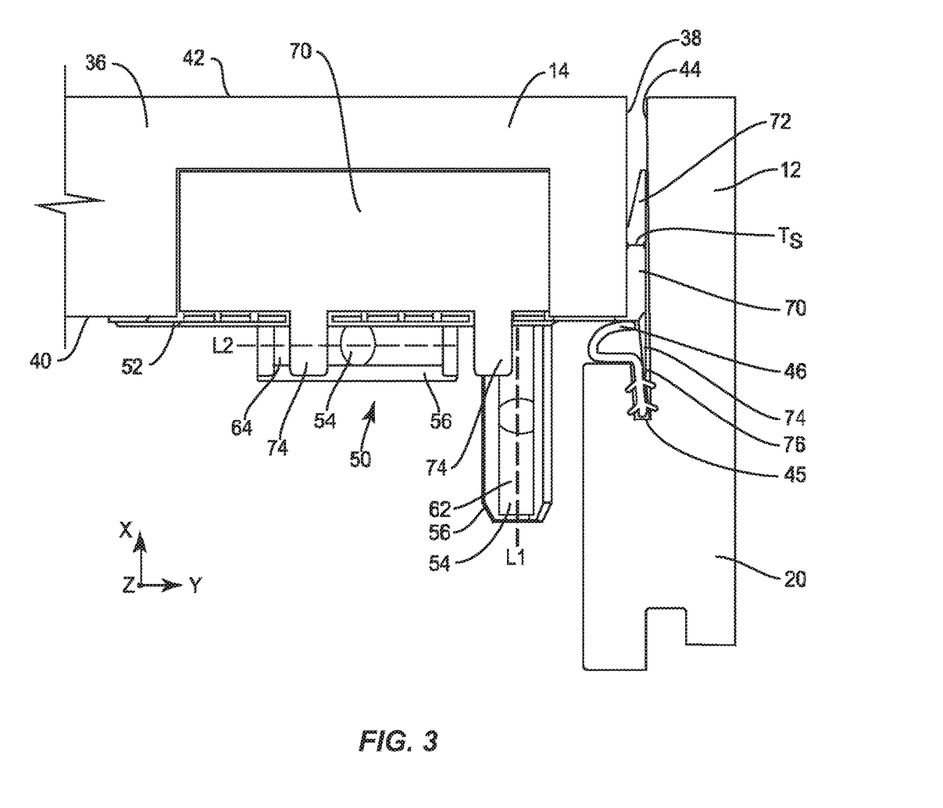
FIG. 3 is a latch-side top view of the pre-hung door of FIG. 2 with the header omitted.
Figure 6:
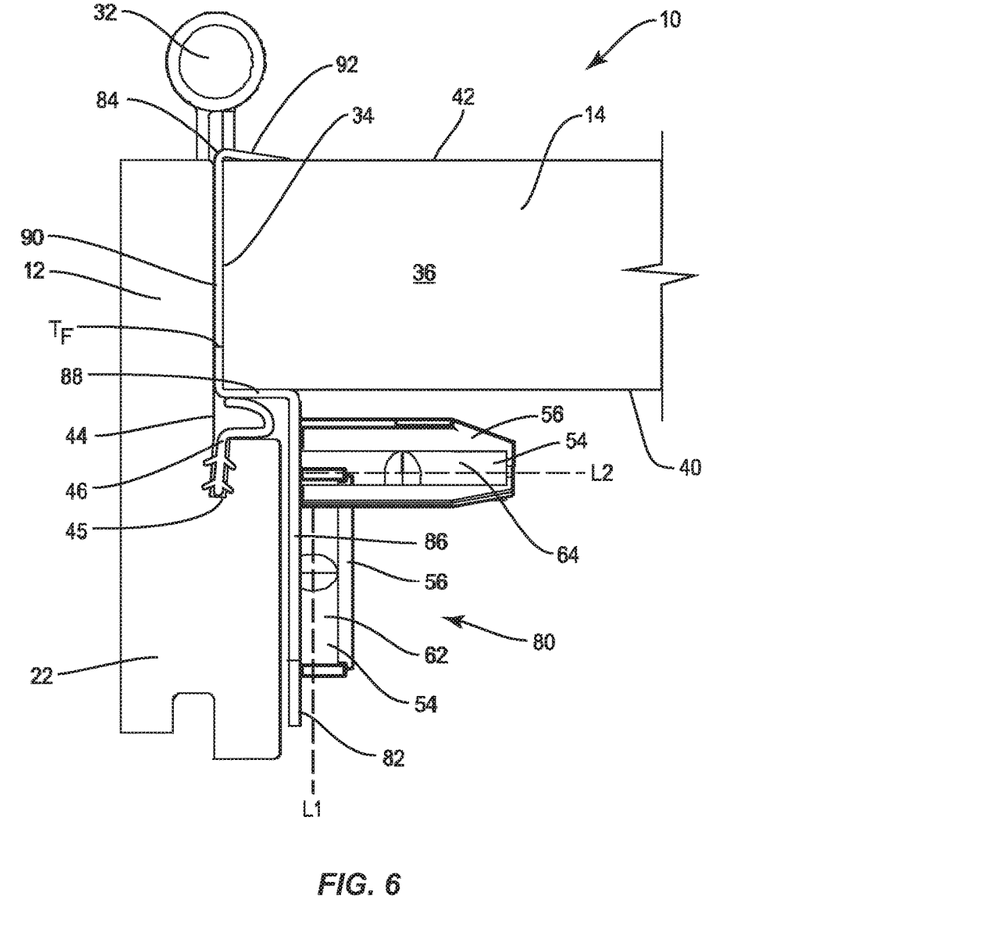
FIG. 6 is a hinge-side top view of the pre-hung door of FIG. 2 with the header omitted.

Shown generally by FIG. 2, the pre-hung door 10 includes a door frame 12 (or simply "frame") having a latch-side jamb 20 and a hinge-side jamb 22. The jambs may be referred to more generally by the term "vertical members" to include any generally vertical portion of a suitable frame 12, such as jambs, mullions, astragals, etc. The frame 12 may include a header 18 spanning the top of the frame from the latch-side jamb 20 to the hinge-side jamb 22. A door panel 14 is attached to the hinge-side jamb 22 by one or more hinges 32 (FIG. 6). The door panel 14 includes a hinged edge 34 (FIG. 6), a top edge 36 (FIG. 3) and a free edge 38 (FIG. 3). The door panel 14 includes an exterior face 40 and an interior face 42 (FIG. 3). As used herein, the terms "exterior" and "interior" are used relative to the building having the rough opening 24 along the X-axis. The terms "inside" and "outside" may also be used relative to the X-axis and the door panel 14, where "inside" means toward the door panel and "outside" means away from the door panel. The header 18 and the jambs 20, 22 may each have a front face 44 with a slot 45 that receives a weather strip 46 as shown in FIG. 3. As used herein, the terms "front" and "back" are used relative to the Y-axis and the center of the door panel 14.

Figure 4:
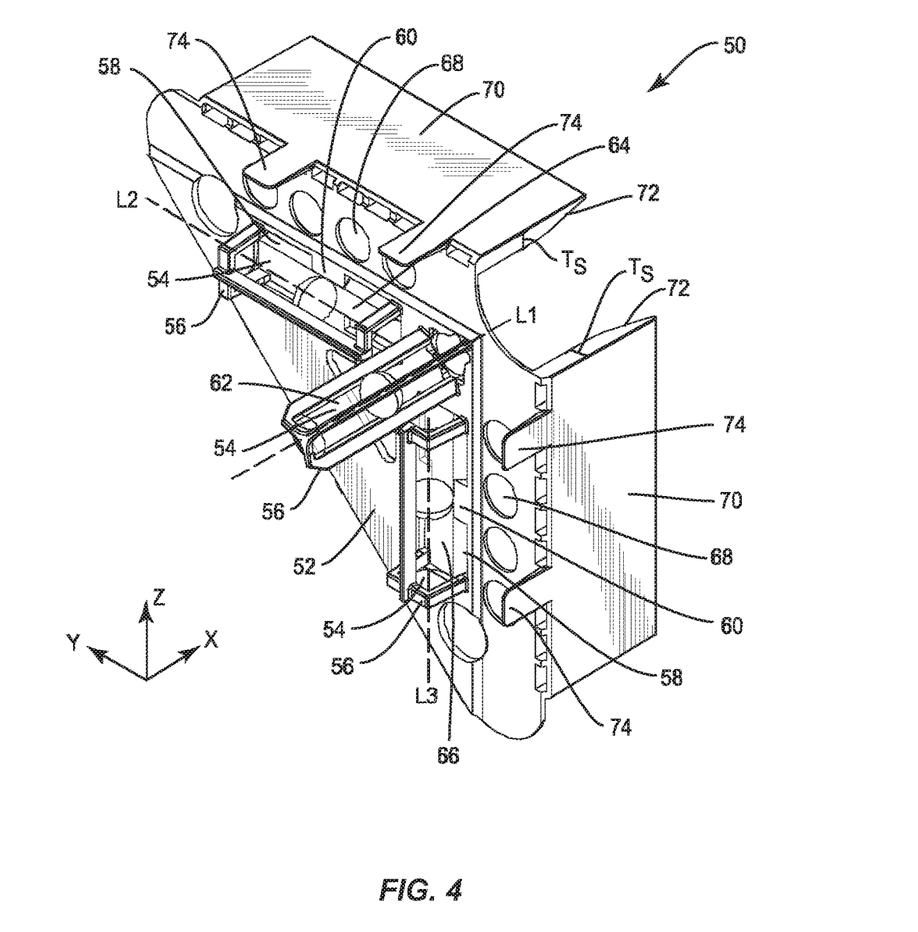
FIG. 4 is an outside perspective view of an installation tool in the form of a corner bracket.
Figure 5:
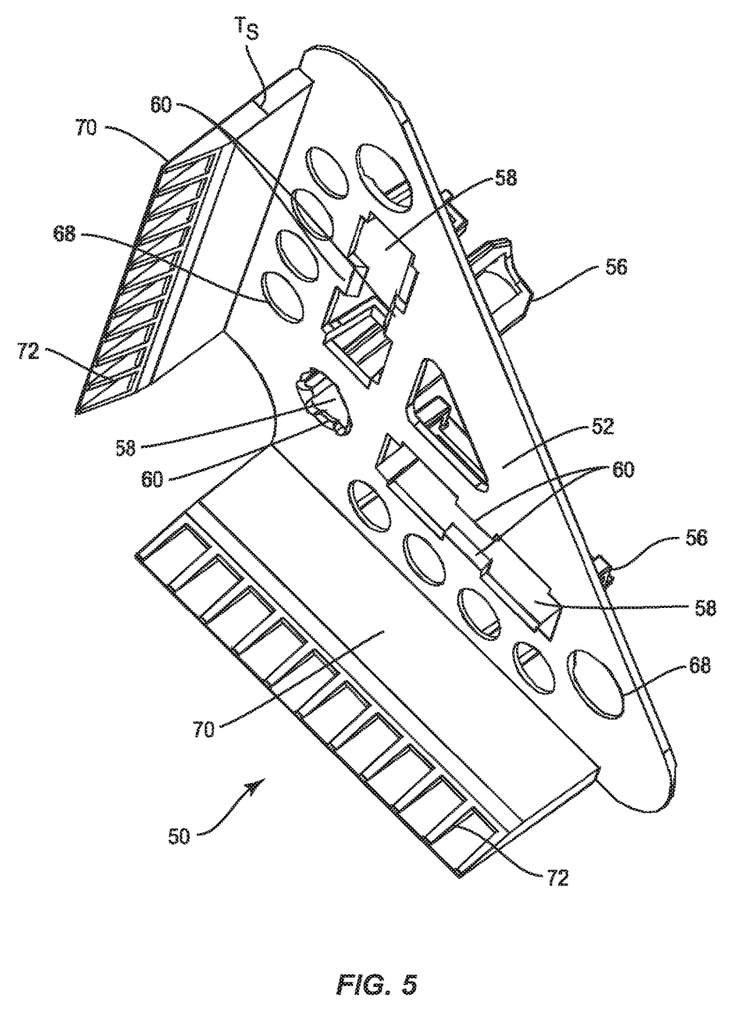
FIG. 5 is an inside perspective view of the corner bracket of FIG. 4 with the orientation indicators omitted.

One of the installation tools 30 may be a corner bracket 50. With reference to FIGS. 3-5, the corner bracket 50 includes a base 52. The base 52 may be configured to be disposed along the exterior face 40 of the illustrated in-swing door panel 14. The base 52 could be disposed along the interior face 42 of an out-swing door. In the illustrated embodiment, the base 52 is triangular, but other shapes such as a square or a rectangle may be suitable. The base 52 is provided with at least one orientation indicator 54. Each orientation indicator 54 may be permanently mounted to the base 52. In other embodiments, the orientation indicators 54 may be removably attached to the base 52. For example, the base 52 may be molded with one or more indicator retention cages 56. In one example, the orientation indicators 54 may be inserted into the indicator retention cages 56 through openings 58 in the base 52. The openings 58 may be restricted by snap fit capture fingers 60 configured to resiliently accept the orientation indicators 54 through the openings 58.

The orientation indicators 54 may be provided in the form of bubble levels. Though a plurality of bubble levels may be packaged together, bubble levels are generally known in two forms. First, single-axis bubble levels have a longitudinal axis and are generally configured to indicate when the longitudinal axis is horizontal, i.e. perpendicular to the force of gravity. Second, bull's-eye bubble levels are also available that allow for indication across two dimensions. Bull's-eye bubble levels indicate when a mounting plane on which the level is resting becomes normal to the force of gravity. The present disclosure generally contemplates the use of one or more single-axis bubble levels. However, similar functionality would also be possible if a bull's-eye level was provided on a mounting surface normal to the base 52.

In the embodiment of FIG. 4, the base 52 is provided with three single-axis bubble levels. A first bubble level 62 has a first longitudinal axis L1 substantially normal to the base 52. When the corner bracket 50 is in-use with the door panel 14 (FIG. 2), the first longitudinal axis L1 is intended to be substantially normal to the face of the closed door panel 14 and parallel with the X-axis, thereby providing an indication of the plumb condition of the pre-hung door 10 (FIG. 2).

A second bubble level 64 and a third bubble level 66 having second and third longitudinal axes L2 and L3, respectively, are also provided. The second and third longitudinal axes L2 and L3 are configured to be perpendicular to one another and generally parallel with the base 52. With the arrangement shown, the corner bracket 50 is reversible. For example, the corner bracket 50 may be used in association with either upper corner of the door panel 14, whether adjacent to the hinge-side jamb 22 or the latch-side jamb 20 (FIG. 2). Therefore, one of the second and third bubble levels 64, 66 will be generally horizontal and capable of indicating a level condition of the pre-hung door 10. The other of the second and third bubble levels 64, 66 may be generally vertical and would not be in-use.

The base 52 may include a variety of other apertures 68 passing therethrough. The apertures 68 may be provided to reduce the weight or material quantity of the corner bracket 50. In one embodiment, the corner bracket 50 is an injection molded polymer with the orientation indicators 54 attached thereto after the molding process. The apertures 68 may also be useful for handling the corner bracket 50.

As seen in FIGS. 3-5, the corner bracket 50 may include at least one spacer 70 extending from the base 52. The spacer 70 may extend substantially normal to the base 52. The spacer 70 may extend from an edge of the base 52. As shown in FIG. 3, the at least one spacer 70 is configured to be positioned between the door panel 14 and the frame 12. In FIG. 3, a spacer 70 is shown between the free edge 38 of the door panel 14 and the front face 44 of the latch-side jamb 20. A second spacer 70 is shown in the illustrated embodiment, which in FIG. 3, is disposed adjacent to the top edge 36 of the door panel 14 and would be between the top edge and the header 18 (FIG. 2) of the frame 12. Again, the arrangement of spacers 70 in the illustrated embodiment would allow for the corner bracket 50 to be selectively usable adjacent to either of the top corners of the door panel 14. In some embodiments, the spacers 70 may be sufficiently tall such that the corner bracket 50 could rest upon a top corner of the door panel 14.

At least a portion of the spacer 70 has a thickness $T_S$ configured to be substantially equal to the desired margin between respective portions of the door panel 14 and the frame 12. By using the spacer 70 to maintain the desired margin, rigidity of the pre-hung door 10 may be improved, and misalignment of the door panel 14 during shipping, handling or installation may be minimized.

An end portion 72 of the spacer 70 may be tapered down from the predetermined margin thickness $T_S$. By tapering the spacer 70, the spacer may be more easily located in the margin between the frame 12 and the door panel 14. As discussed below, the corner bracket 50 may be attached to the frame 12 prior to closing the door panel 14. The tapered end portion 72 of the spacer 70 may reduce interference as the door panel 14 is being closed.

In some embodiments, the corner bracket 50 may be removably fixed, such as by a compression fit, to the door panel 14. The present embodiment, however, does not envision fixing the corner bracket 50 to the door panel 14. Instead, the corner bracket 50 may be configured to be removably mounted to the frame 12 such that the corner bracket 50 may be attached to the frame prior to closing the door panel 14. The corner bracket 50 may also be configured to remain in position with respect to the frame 12 as the door panel 14 is pivoted to an open position. As seen in FIG. 3, the corner bracket 50 may be mounted to the frame 12 with at least one tongue 74 configured to be disposed between the weather strip 46 and the front face 44 of a portion of the frame 12. The at least one tongue 74 may provide a friction fit with the weather strip 46 and the frame 12 to hold the corner bracket 50 in place. The tongue 74 may be described as extending from the base 52 in a direction opposite the at least one spacer 70. In the illustrated embodiment, a plurality of tongues 74 is provided, with at least one tongue extending from two different edges of the base 52. Thus a tongue 74 may contact the weather strip 46 associated with the header (not shown) and a tongue may contact the weather strip associated with one of the vertical frame members, such as the latch-side jamb 20.

To facilitate positioning the tongue 74 between the weather strip 46 and a corresponding portion of the frame 12, the tongue 74 may include a tapered edge 76 so that the tongue may be wedged between the weather strip and the frame.

Figure 7:
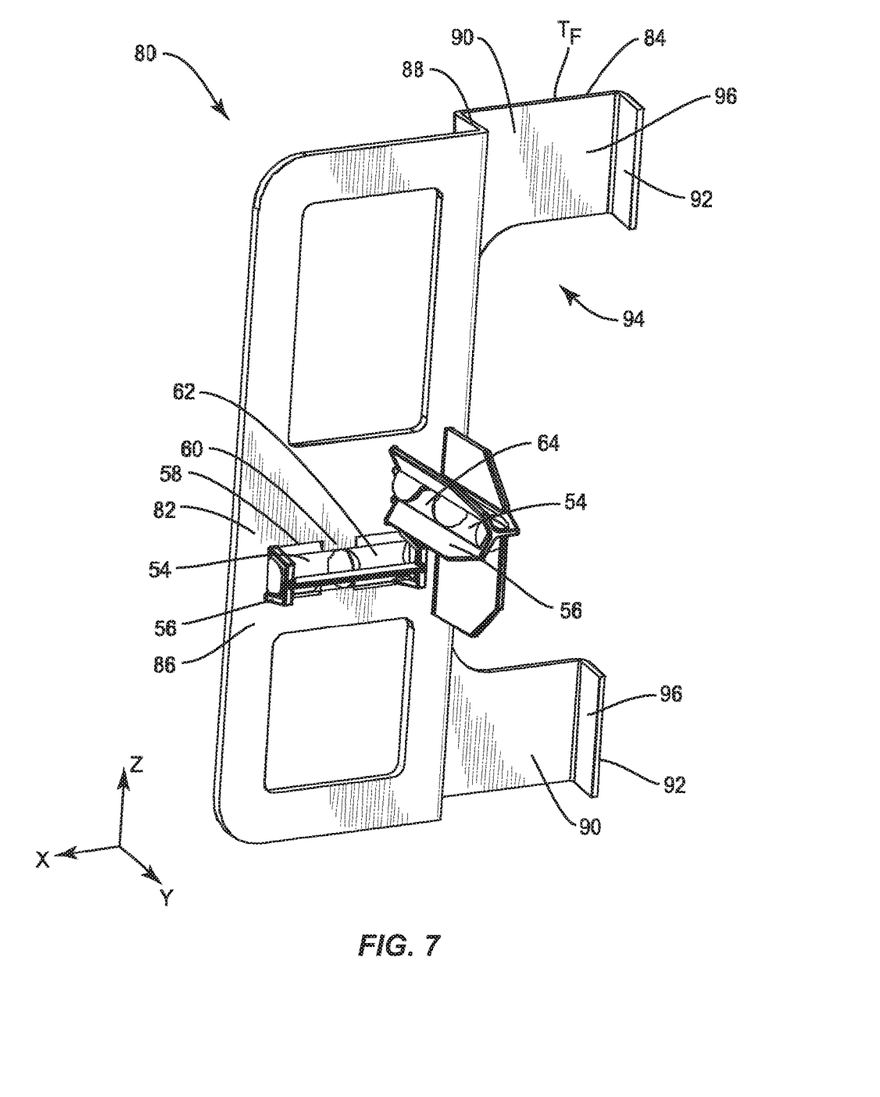
FIG. 7 is a front perspective view of an installation tool in the form of an edge bracket.
Figure 8:
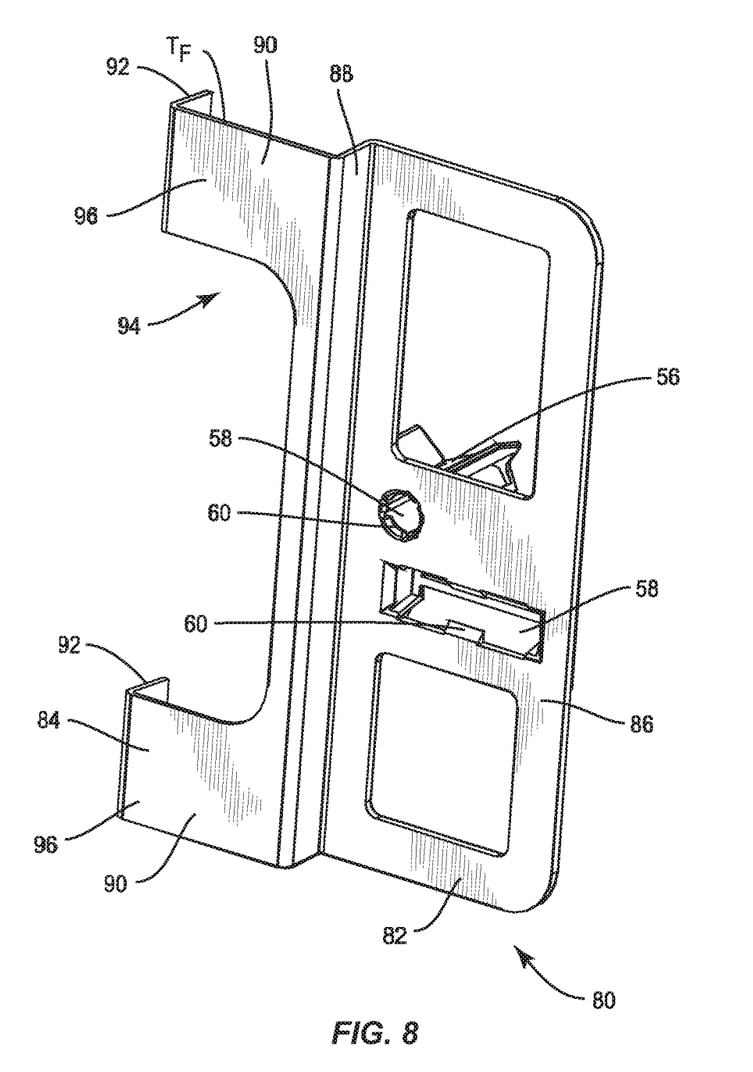
FIG. 8 is a back perspective view of the edge bracket of FIG. 7 with the orientation indicators omitted.

Turning to FIGS. 6-8, another of the installation tools 30 may be an edge bracket 80. The edge bracket 80 includes an indicator portion 82 and a mounting portion 84. The indicator portion 82 includes a plate body 86 to which at least one orientation indicator 54 is mounted. In the illustrated embodiment, the edge bracket 80 is configured such that the plate body 86 is arranged along the front face 44 of the hinge-side jamb 22, generally perpendicular to the exterior face 40 and the interior face 42 of the door panel 14. In other embodiments, the plate body 86 may be configured to be substantially flush with either the exterior face 40 or the interior face 42 of the door panel 14. As discussed above regarding the corner bracket embodiment, the orientation indicators 54 of the edge bracket 80 may be single-axis bubble levels or bull's-eye bubble levels. The orientation indicators 54 may include a first bubble level 62 arranged with a first longitudinal axis L1 to be substantially normal to the door panel 14 and configured to indicate the plumb condition of the pre-hung door 10. The orientation indicators 54 may include a second bubble level 64 arranged with a second longitudinal axis L2 substantially parallel with the plane of the door panel 14 and configured to indicate a level condition of the pre-hung door 10. The orientation indicators 54 may be removably attached to the plate body 86. For example, the plate body 86 may be molded with one or more indicator retention cages 56. In one example, the orientation indicators 54 may be inserted into the indicator retention cages 56 through openings 58 in the plate body 86. The openings 58 may be restricted by snap fit capture fingers 60 configured to resiliently accept the orientation indicators 54 through the openings 58.

The indicator portion 82 of the edge bracket 80 may be integrally molded with the mounting portion 84. The mounting portion 84 may be configured to friction fit the edge bracket 80 to an edge, sometimes referred to as a stile, of the door panel 14. In the illustrated embodiment, the mounting portion 84 may be comprised of a first flange 88 extending from the plate body 86 and configured to be positioned along the exterior face 40 of the door panel 14. In other embodiments, the first flange 88 may be positioned along the interior face 42. A second flange 90 extends from the first flange 88 and is configured to be positioned along the stile of the door panel 14. A third flange 92 extends from the second flange 90 and is configured to be positioned along the interior face 42 of the door panel 14. If the first flange 88 is along the interior face 42, the third flange may be along the exterior face 40. The third flange 92 may be formed to slightly converge toward the first flange 88. The converging flanges, in combination with the resiliency of the material used to form the mounting portion 84, may provide a compressive force to allow the edge bracket 80 to friction fit to an edge of the door panel 14. The angled and resilient nature of the third flange 92 may also allow for the edge bracket 80 to accommodate door panels 14 of a range of thicknesses.

In the illustrated embodiment, the edge bracket 80 is configured as a hinge-side bracket. Specifically, a portion of the second and third flanges 90, 92 may be omitted or removed to provide a hinge gap 94 with a pair of spaced apart clamping arms 96 to be positioned on opposite sides of a hinge 32. Therefore, the hinge 32 may help prevent the edge bracket 80 from sliding down along the hinged edge 34 of the door panel 14. The illustrated embodiment of the edge bracket 80 may also be considered a hinge-side bracket because attachment of the edge bracket to the free edge 38 (FIG. 3) of the door panel 14 may be impeded by the plate body 86 if the plate body is to be maintained on the exterior side of the in-swing door panel as shown. That said, other embodiments of the edge bracket 80 are contemplated that have a mounting portion 84 for mounting to either the hinged edge 34 or the free edge 38 of the door panel 14, particularly when the indicator portion 82 may be positioned along the exterior face 40 or the interior face 42 of the door panel.

The edge bracket 80 may also be configured to maintain proper spacing between the frame 12 and the door panel 14. For example, the second flange 90 may have a thickness $T_F$ configured to be substantially equal to a predetermined margin between the hinge-side jamb 22 and the hinged edge 34 of the door panel 14. Again, incorporating the edge bracket 80 as part of the pre-hung door 10 may function to increase the rigidity of the pre-hung door and help prevent misalignment of the door panel 14 within the frame 12 during shipping, handling or installation.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. An assembly, comprising:
  a door frame, comprising:
    a first vertical member,
    a second vertical member, and
    a header spanning the top of the door frame from the first vertical member to the second vertical member;
  a door panel;
  at least one hinge mounting the door panel to the first vertical member; and
  a first tool, comprising:
    a base;
    at least one orientation indicator mounted to the base;
    at least one spacer extending from the base, the at least one spacer positioned between an edge of the door panel and a respective portion of the door frame adjacent thereto; and at least one tongue extending from the base in a direction opposite the at least one spacer, the at least one tongue inserted between a weather strip and a face of the door frame such that the first tool remains in place when the door panel is open, wherein the at least one orientation indicator is a single-axis bubble level.

2. The assembly of claim 1, comprising two single-axis bubble levels, the two bubble levels arranged perpendicular to one another such that a first bubble level indicates a plumb condition of the assembly and a second bubble level indicates a level condition of the assembly.

3. The assembly of claim 2, further comprising a third single-axis bubble level arranged perpendicular to the second bubble level, wherein the second bubble level indicates the level condition of the assembly when the first tool is arranged at a first corner of the door panel and the third bubble level indicates the level condition of the assembly when the first tool is arranged at a second corner of the door panel.

4. The assembly of claim 1, wherein the at least one spacer comprises:

a first spacer positioned between the top of the door panel and the header of the door frame, and a second spacer positioned between a stile of the door panel and one of the first and second vertical members of the door frame.

5. The assembly of claim 1, wherein the at least one spacer having a thickness equal to a predetermined margin between the door panel and the door frame.

6. The assembly of claim 1, wherein at least one of the spacer and the at least one tongue has a thickness that is tapered.

7. An assembly, comprising:

a door frame, comprising:
  a first vertical member,
  a second vertical member, and
  a header spanning the top of the door frame from the first vertical member to the second vertical member;

a door panel;

at least one hinge mounting the door panel to the first vertical member; and a first tool, comprising:
  a base;
  at least one orientation indicator mounted to the base;
  at least one spacer extending from the base, the at least one spacer positioned between an edge of the door panel and a respective portion of the door frame adjacent thereto; and
  at least one tongue extending from the base in a direction opposite the at least one spacer, the at least one tongue inserted between a weather strip and a face of the door frame such that the first tool remains in place when the door panel is open, further comprising a second tool positioned on the door panel adjacent to the first vertical member, the second tool comprising at least one bubble level.

8. The assembly of claim 7, wherein the second tool is friction fit to an edge of the door panel.

9. The assembly of claim 7, wherein the second tool has a thickness equal to a predetermined margin between the door panel and the first vertical member.

10. The assembly of claim 7, wherein the second tool has a pair of spaced apart clamping arms positioned on opposite sides of the at least one hinge.

* * * * *